US010134202B2

(12) United States Patent
Schleicher

(10) Patent No.: US 10,134,202 B2
(45) Date of Patent: Nov. 20, 2018

(54) AUTOMATIC ADDRESS VALIDATION

(75) Inventor: Joerg Schleicher, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 859 days.

(21) Appl. No.: 10/990,593

(22) Filed: Nov. 17, 2004

(65) Prior Publication Data

US 2006/0106738 A1 May 18, 2006

(51) Int. Cl.
*G06Q 30/06* (2012.01)
*G07B 17/00* (2006.01)

(52) U.S. Cl.
CPC .................. *G07B 17/00435* (2013.01); *G07B 2017/00443* (2013.01); *G07B 2017/00451* (2013.01)

(58) Field of Classification Search
USPC .................................... 705/1, 404, 405, 410
See application file for complete search history.

(56) References Cited

U.S. PATENT DOCUMENTS

| | | | | |
|---|---|---|---|---|
| 5,454,038 | A * | 9/1995 | Cordery et al. | 705/60 |
| 5,504,677 | A * | 4/1996 | Pollin | 705/45 |
| 5,930,796 | A * | 7/1999 | Pierce et al. | |
| 6,073,124 | A | 6/2000 | Krishnan et al. | 705/59 |
| 6,175,827 | B1 * | 1/2001 | Cordery et al. | 705/410 |
| 6,253,219 | B1 | 6/2001 | Gardner et al. | 715/530 |
| 6,535,856 | B1 | 3/2003 | Tal | 705/1 |
| 6,575,376 | B2 | 6/2003 | Yu | 235/494 |
| 6,836,765 | B1 * | 12/2004 | Sussman | G06Q 20/02 705/75 |
| 7,865,427 | B2 * | 1/2011 | Wright et al. | 705/38 |
| 8,712,877 | B2 * | 4/2014 | Stremler et al. | 705/30 |
| 8,731,953 | B2 * | 5/2014 | Cook | G06Q 10/107 705/1.1 |
| 9,514,458 | B2 * | 12/2016 | Rutherford | G06Q 20/04 |
| 2002/0038261 | A1 * | 3/2002 | Kargman | G06Q 10/08 705/15 |
| 2003/0040997 | A1 * | 2/2003 | Rousseau et al. | 705/35 |
| 2003/0101143 | A1 * | 5/2003 | Montgomery et al. | 705/62 |
| 2004/0008368 | A1 * | 1/2004 | Plunkett | G06F 3/1204 358/1.15 |
| 2004/0128254 | A1 * | 7/2004 | Pintsov | G07B 17/00435 705/62 |
| 2004/0128390 | A1 * | 7/2004 | Blakley et al. | 709/228 |
| 2005/0149765 | A1 * | 7/2005 | Aldstadt | G06Q 10/08 713/300 |
| 2006/0285692 | A1 * | 12/2006 | Kerstens | H04L 29/06 380/270 |
| 2010/0100454 | A1 * | 4/2010 | Sines et al. | 705/26 |
| 2013/0243188 | A1 * | 9/2013 | Emigh et al. | 380/30 |
| 2014/0226534 | A1 * | 8/2014 | Felger | H04M 15/68 370/259 |

* cited by examiner

*Primary Examiner* — Akiba K Allen
(74) *Attorney, Agent, or Firm* — Haynes and Boone, LLP

(57) ABSTRACT

An identifier is received with a portion of a postal address. That portion is compared against multiple additional postal addresses associated with the identifier. If a match is detected, a confirmation is transmitted to a requestor who originally sent the identifier and the portion of the postal address.

20 Claims, 5 Drawing Sheets

AUTOMATIC ADDRESS VALIDATION

FIELD

The invention relates generally to data processing and more specifically to on-line data processing with automatic address validation.

BACKGROUND

When an on-line buyer attempts to purchase something from an on-line merchant's service over the World-Wide Web (WWW) a variety of security mechanisms are used to protect both the on-line buyer and the on-line merchant from fraud. For example, the buyer and the merchant may interact with one another using secure communications, such as Hypertext Transfer Protocol (HTTP) over Secure Sockets Layer (SSL) referred to as HTTPS. Yet, even when secure communications are implemented fraud can still occur.

For instance, buyers may attempt to feign their electronic identities during on-line transactions with the merchant. One way this may occur is for a buyer to use a delivery address for a product that is different from a billing address that the merchant maintains for a buyer's account. In fact in some cases, the merchant may not maintain addresses at all for its buyers; thus, a malicious buyer may charge with a different person's credit card and have the goods delivered to location being monitored by the malicious buyer.

To combat the problems associated with postal addresses, many merchants will use an Address Verification Service (AVS) for credit card purchases. An AVS compares a given postal address of an on-line buyer against a billing address for the buyer. The billing address is typically listed on a credit card account which is being used by the buyer for a given transaction. However, sometimes a buyer may actually have multiple addresses that are legitimate, such as when a buyer has a business address and a home address, when a buyer maintains two homes, and the like. Furthermore, an AVS generally requires an exact match against a supplied address and recorded billing address. Thus, even small mistakes or alternative spellings may result in erroneous rejections, which may be annoying to buyers or may result in non-consummated purchases for a merchant.

Additionally, buyers may not always use credit cards to make on-line purchases; that is, buyers may prefer to make on-line purchases via loans, funded accounts, electronic fund transfers, and the like. When alternative purchasing arrangements are used, the on-line merchant may not be capable of processing the transaction through an AVS and/or may have to rely on its own security initiatives to protect against fraud, but at the same time the merchant still wants to provide its buyers (customers) with the purchasing flexibility that they demand. This flexibility includes allowing buyers to use multiple addresses for purposes of acquiring goods and permitting the buyers to use multiple purchasing options for purposes of funding purchases.

SUMMARY

In various embodiments, techniques are presented for automatically validating addresses during on-line purchasing transactions. More specifically, and in an embodiment, an identifier and a portion of a postal address are received from a merchant. In response to the identifier an account is located, where that account may be associated with a one or more additional postal addresses. If the portion of the received postal address matches some portion of the one or more additional postal addresses, then a confirmation is communicated to the merchant; otherwise a rejection may be communicated to the merchant.

DETAILED DESCRIPTION

Figure 1:
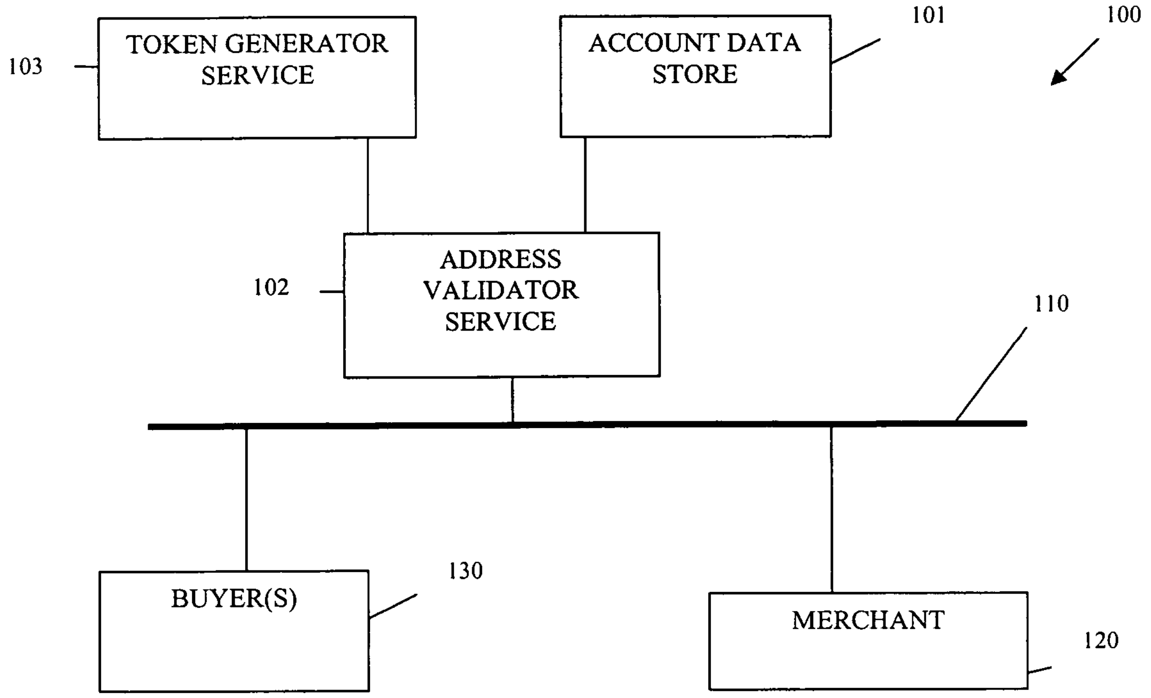
FIG. 1 is a diagram of an automatic address validation system, according to an example embodiment.

FIG. 1 is a diagram of an automatic address validation system 100, according to an example embodiment. The automatic address validation system 100 is implemented in a machine-accessible and readable medium and is accessible over a network. In an embodiment, the network may be hardwired, wireless, or a combination of hardwired and wireless. In another embodiment, the automatic address validation system 100 is implemented as a service to an on-line merchant, where that service automatically validates postal addresses associated with on-line buyers that are parties to on-line purchasing transactions with the on-line merchant.

In an embodiment, an on-line banking, payment, or transaction service is modified to include the automatic address validation system 100. One such example service is PayPal®. The on-line banking or transaction service maintains accounts for users. A user's account may be based on a user's identification. The identification may be resolved based on a unique email address for the user, name, account identifier, social security number, etc. Each account may include one or more postal addresses associated with the user and one or more methods of payment, such as loans, debit cards, credit cards, funded accounts, electronic transfer accounts, and the like.

The automatic address validation system 100 includes an account data store 101 and an address validator service 102. In an embodiment, the automatic address validation system 100 also includes a token generator service 103.

The account data store 101 maintains identifiers for users. A user may be individuals that make purchases (buyers) from on-line merchants via the Internet and the WWW. Alternatively, a user may be on-line merchants that may direct buyers to the automatic address validation system 100 for making payment of goods or services being sold by the on-line merchants. The on-line merchants also directly interact with the automatic address validation system 100 for purposes of validating postal addresses supplied by buyers during on-line purchasing transactions. Thus, the automatic address validation system 100 may interact over a network 110 with merchants 120 and/or buyers 130. The merchants 120 and the buyers 130 have accounts within the account data store 101 distinguished by account identifiers. The account data store 101 may be a database, a collection of databases logically organized as a data warehouse, directories, electronic files, or any various combinations of the same.

The address validator service 102 is adapted to receive validation requests from merchants 120 over the network 110. The network 110 may be hardwired, wireless, or a combination of hardwired and wireless. In an embodiment, the network 110 is the Internet and the merchant interacts with the address validator service 102 using WWW browser commands, protocols, and/or Application Programming Interfaces (APIs).

The merchants 120 may contact the address validator service 102 for a variety of reasons. One reason may be that the merchant 120 desires to validate a shipping address supplied by a potential buyer 130 of a good or service being offered by that merchant 120. The merchant 120 may not maintain address information for the potential buyer 130 or may decide that the address information which it has for the potential buyer 130 is inadequate in some manner. Another reason that the merchant 120 may desire to validate a portion of a supplied buyer's shipping address is that the merchant 120 may have its own risk assessment calculation (e.g., fraud score, credit score, etc.) that utilizes a validated portion of an address as a portion of its risk assessment calculation.

Thus, the merchant 120, among other things, collects shipping address information from the potential buyer 130. The merchant 120 then decides that it can not independently validate the shipping address supplied by the buyer 130 or that it desires independent validation from the automatic address validation system 100. At this point, the merchant 120 dynamically contacts the address validator service 102 over the network 110.

In an embodiment, the merchant 120 may have to authenticate itself to the address validator service 102. One technique for doing this is for the merchant to supply a public certificate associated with the address validator service 102 which has been encrypted with the public-private key pair of the merchant 120 and the public key of the address validator service 102. Another technique may be for the merchant 120 to automatically supply an identification and password pair that authenticates itself to the address validator service 102. In still another technique, the address validator service 102 may maintain a trusted and secure connection with the merchant 120.

Once the merchant 120 establishes a dynamic and real-time session with the address validator service 102, the merchant 120 supplies the address validator service 102 with an identification and an address pair for its potential buyer 130. The identification may be an email address of the buyer 130 or a last name of the buyer 130. The address is at least a portion of a postal address associated with shipping or billing address that the buyer 130 had supplied to the merchant 120 during an on-line purchasing transaction. In an embodiment, the portion includes a postal zip code and a configurable amount of text associated with a postal street address. For example, the portion may include a text string "BEC 45069" where ""BEC" is the first three characters of a buyer 130 supplied street name and "45069" is the zip code of the buyer 130 supplied shipping address.

Armed with an identifier for the buyer 130 and the portion of a postal address, the address validator service 102 is adapted to search the account data store 101 for purposes of locating an account for the buyer's identifier. If no such account exists in the account data store 101, then the address validator service 102 is adapted to send a notification or rejection over the network to the merchant 120. The rejection lets the merchant 120 know that the address validator service 102 cannot vouch for or validate the buyer 130.

If the address validator service 102 does locate an account within the account data store 101 for the buyer's identification, then the account record is retrieved. The found record will include potentially multiple postal addresses for the buyer 130 or a single complete postal address for the buyer 130. Next, the address validator service 102 compares the portion of the postal address against the one or more postal addresses associated with the found account record. If a match occurs with portions of one of the one or more postal addresses, then the address validator service 102 is adapted to dynamically transmit or send a confirmation over the network 110 to the requesting merchant 120. The merchant 120 can then rely on this information to ensure that the shipping address supplied by the buyer 130 is legitimate and may proceed with the on-line purchasing transaction.

In an embodiment, a validated portion of a postal address may also be used in combination with the buyer's identifier to generate a token. Accordingly, the automatic address validation system 100 may include a token generation service 103. The token generation service 103 is adapted to generate a limited-use token which it communicates back to the merchant 120 (via the address validator service 102) with the confirmations. In some cases, the token includes an encrypted version of the buyer's identification and the portion of the supplied postal address. The token may be automatically appended to redirected requests of the buyer 130 and used to authenticate the buyer 130 and its purchasing transaction to the automatic address validation system 100 for one or more subsequent transactions that may occur between the buyer 130 and the automatic address validation system 100.

For example, consider a buyer 130 that is checking out and purchasing a good or service from a merchant's WWW site using a WWW browser interface. In this example, the merchant 120 collects shipping information and other identifying information from the buyer 130 necessary to consummate the desired purchase. The merchant 120 dynamically and automatically interacts with the address validator service 102 unbeknownst to the buyer 130 and receives a confirmation and a token. Next, the buyer 130 is redirected via its browser to the automatic address validation system 100 for purposes of making a payment for the desired good or service. During this redirection, the merchant 120 appends the token, such that the automatic address validation system 100 recognizes the token and uses the presence of the token as a verification that the buyer 130 is whom it purports to be and to access the buyer's account from the account data store 101 in order to supply the buyer 130 with a variety of payment options in order to consummate the purchase of the desired good or service.

In some embodiments, any token that is generated by the token generator service 103 may be revoked by the automatic address validation system 100. This may be done for purposes of added security. Thus, a token may become useless after a predefined period of elapsed time (e.g., 24 hours, etc.), after a predefined calendar date occurs (e.g., Nov. 11), after a predefined condition or event is detected (e.g., buyer 130 logs out or exits from its WWW browser either normally or abnormally, etc.), and the like. The elapsed time periods, conditions, or events may be based on defaults or profiles associated with the merchant 120 or the buyer 130 and may be recorded within the account data store 101. Alternatively, the elapsed periods, conditions, or events may be global to groups of merchants 120 and/or buyers 130 and managed by the automatic address validation system 100 independent of the account data store 101.

The automatic address validation system 100 provides merchants 120 with the ability to acquire some initial assurance about a potential buyer's postal address. This automatic and dynamic assurance may be used for a variety of beneficial reasons, such as to provide a factor for a merchant's risk assessment calculation, to permit the merchant 120 to make a decision as to whether a purchasing transaction should be offloaded to the automatic address validation system 100, and/or to provide the merchant 120 with some assurance as to the address provided by the buyer 130.

Figure 2:
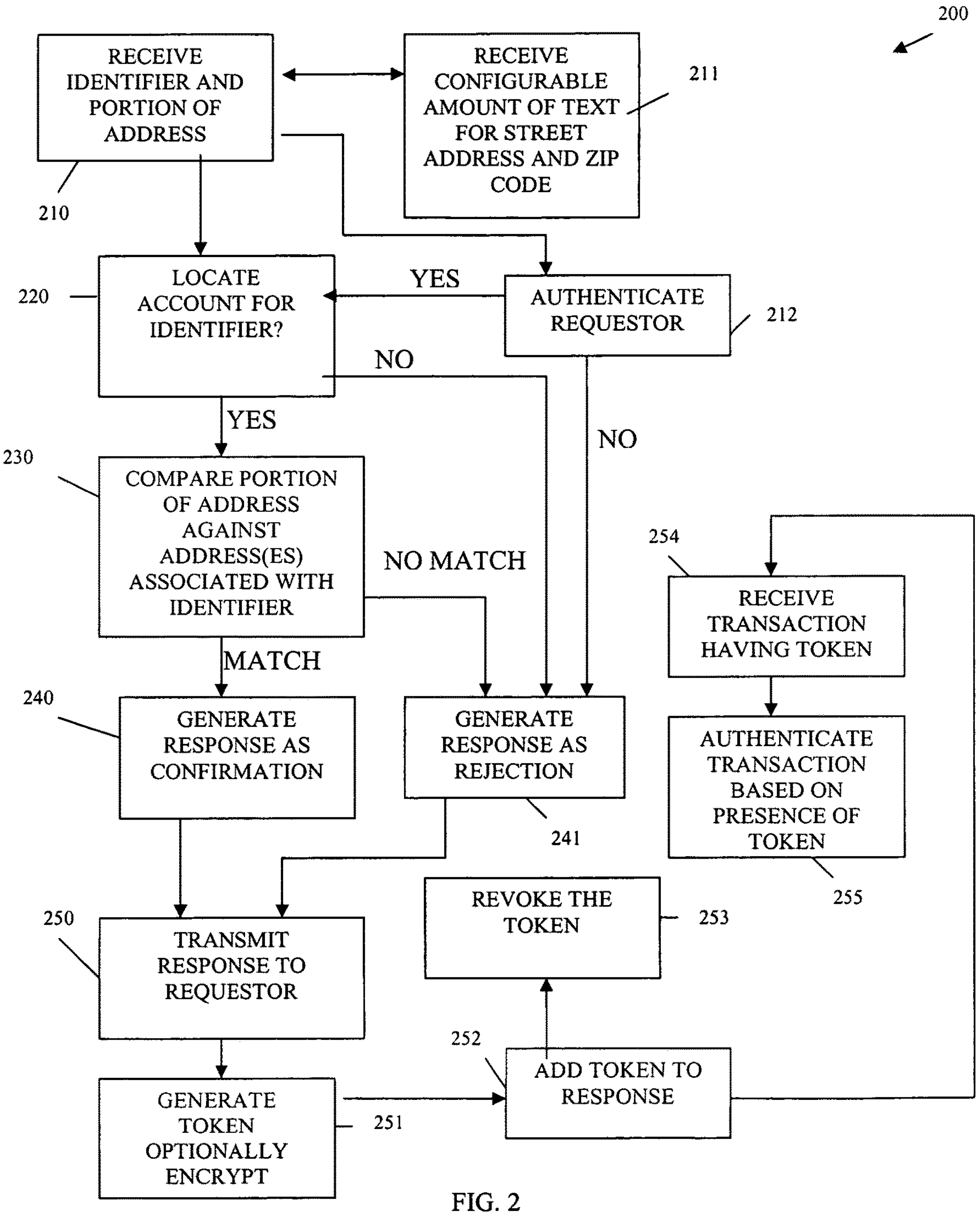
FIG. 2 is a diagram of a method for automatic address validation, according to an example embodiment.

FIG. 2 is a diagram of a method 200 for automatic address validation, according to an example embodiment. The method 200 (hereinafter referred to as "address validation service") is implemented in a machine-accessible and readable medium and is accessible over a network. In an embodiment, the address validation service is implemented as the address validator service 102 of the automatic address validation system 100 depicted in FIG. 1.

Initially, a requestor is configured to interface with the address validation service. A requestor may be an on-line merchant, an on-line-buyer, and/or other automated/manual services or interfaces. In an embodiment, the interface is a WWW browser and APIs associated with WWW browser interactions and Internet communications.

At 210, the address validation service receives an identifier and at least a portion of a postal address. The identifier is associated with another user that is interacting with the requestor separately and distinctly from the interactions of the requestor and the address validation service. An identifier uniquely identifies a particular user. Some example, identifiers may include an electronic mail address, a full name (last name, first name, middle name, etc.), an account identifier, a social security number, and others. The portion of the postal address may include all or some configurable amount of a postal address, at 211, that was supplied by the user to the requestor. An example configurable portion may include a postal zip code and the first X number of characters associated with the text of a postal street address name, where X is an integer greater than 0.

In an embodiment, at 212, the address validation service authenticates the requestor before evaluating the identifier and the portion of the postal address supplied by the requestor. Authentication may occur through a variety of techniques, such as via digital certificates, digital signatures, passwords, and/or other public-private key infrastructure (PKI) techniques. This ensures that rogue requestors are not attempting to interact with the address validation service for nefarious purposes, such as trying to validate acquired information about users.

In response to the received identifier and the portion of the postal address, the address validation service, at 220, attempts to locate an account being maintained within the address validation service's environment for the identifier. As an example, consider an identifier that is an electronic mail (email) address for a user. In this example, the address validation service attempts to locate an account for that user that includes the email address represented as the identifier.

If the address validation service does not locate a matching account for the received identifier, then, at 241, a rejection may be sent or transmitted back to the requestor. The requestor may then elect to send a different identifier for the user back to the address validation service, such as one on file or such as one dynamically requested by the requestor from the user. Alternatively, the requestor may use the rejection in its risk assessment calculation or use the rejection to inform the user that with the information provided the desired purchasing transaction of the buyer cannot proceed.

In an embodiment, the address validation service may actually match the received user identifier with an account; however, the address validation service may still elect, at 241, to send or transmit a rejection back to the requestor. This may occur when the matching account is locked, restricted, or closed.

Moreover, any rejection sent, at 241, may include information that permits the requestor to discern why a rejection was sent. These rejections may be expressed as codes or strings, which the requestor may be pre-configured to automatically process. For example, an identifier not located may be associated with a rejection of "ACCOUNT NOT FOUND," while an account locked may be associated with a rejection of "ACCOUNT UNAVAILABLE."

Assuming that the address validation service does locate a matching account for the received identifier which is available for use, then, at 230, a potential plurality of candidate postal addresses or at least one candidate address associated with the found account is compared against the received portion of the postal address. That is, the accounts maintained by the address validation service may each include a plurality of postal addresses for each identifier or may include a single postal address. This represents the practicalities associated with many users, where a user may include a business address as a shipping address and a home address as a billing address or where the user may include multiple home addresses, such as when users maintain multiple different homes. Of course, there may be a variety of other reasons for which a user may have multiple different postal addresses, all such situations benefit from the teachings presented herein.

If the portion of the received postal address is successfully matched against some portion of one of the multiple candidate postal addresses which are associated with the found account, then, at 240, the address validation service generates a response as a confirmation. Conversely, if a match is not made, then, at 241, the address validation service generates a response as a rejection. At 250, the response is dynamically transmitted back to the requestor.

In some embodiments, at 251, the address validation service may also elect to generate a limited-use token with responses designated as confirmations. At 252, the token is added to the response being transmitted to the requestor. In some cases, the limited-use token may be subsequently revoked by the address validation service.

The token includes encrypted or encoded data that is capable of being decrypted or decoded by the address validation service. In an embodiment, the encoded data includes the received identifier and the portion of the postal address. However, any data random or static may be encoded within the token. The address validation service does not have to store the token, since the address validation service knows how to decrypt or decode the token. The token permits the address validation service to match a user and its postal address with a particular user and/or a particular user's specific purchasing transaction received from the requestor.

Thus, at some later point in processing, if the address validation service receives a transaction request from a user which includes the token, at 254, the address validation service may authenticate the transaction based on the presence of the token, at 255. In such a transaction, the postal address associated with the token is fixed and not capable of being altered or changed by the user during the transaction processing.

Again, the token may have a limited lifespan, such that it is capable of being revoked by expiration, at 253. In an embodiment, expiration may occur after a predefined period of elapsed time, such as 24 hours after the requestor initially receives the token with a response that is a confirmation. In other embodiments, the expiration may occur upon the detection of a predefined condition or event, such as when the user exits out of a WWW browser after initially interacting with the requestor during a purchasing transaction. The limited lifespan of the token adds another level of security to a user's purchasing transactions.

It should be noted that a user does not have to be aware of the processing that takes place between the requestor and the address validation service. Moreover, all the processing that takes place is automatic (without manual intervention), in real-time, and is dynamic.

As an example, the requestor (e.g., merchant) interacts with the address validation service for purposes of validating a portion of a user's (e.g., buyer's) provided postal address. The merchant then decides whether to send the buyer back to the address validation service in order to consummate a purchasing transaction. If the merchant elects to direct the buyer back to the address validation service to consummate the purchasing transaction, then the merchant redirects the buyer's WWW browser to a page associated with a purchasing transaction of the address validation service. The redirection includes the token, which the address validation service uses to determine the identity of the user and to determine the postal address. At this point, the user may select each of his available funding techniques for consummating the purchasing transaction with the merchant, such as through credit cards, funded accounts, loans, electronic transfers, etc.

Figure 3:
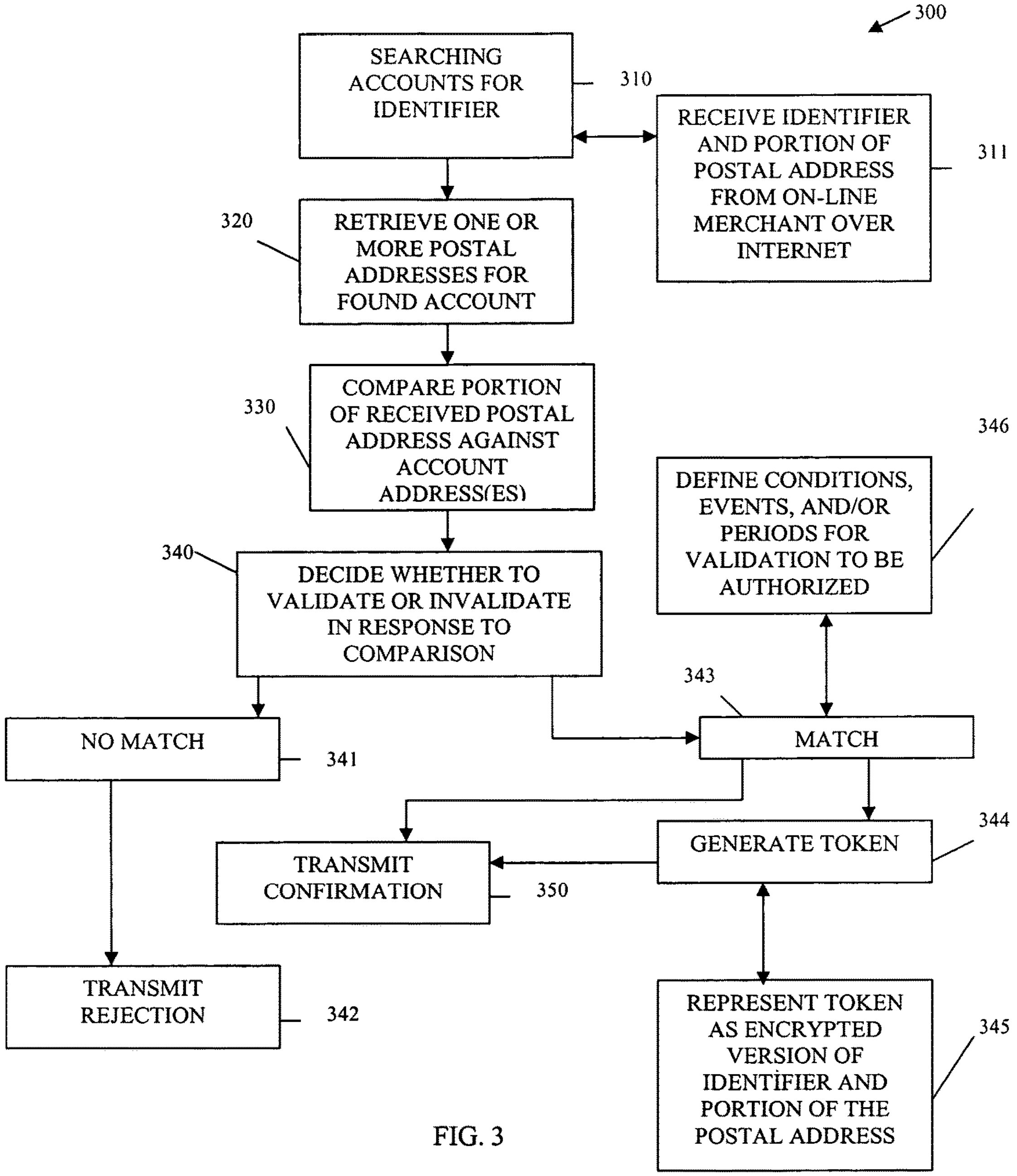
FIG. 3 is a diagram of another method for automatic address validation, according to an example embodiment.

FIG. 3 is a diagram of another method 300 for automatic address validation, according to an example embodiment. The method 300 is implemented in a machine-accessible and readable medium and is accessible over a network. The processing of the method 300 (hereinafter referred to as "processing") provides an alternative view to the address validation service of the method 200 of FIG. 2.

The processing searches accounts for an identifier, at 310. In an embodiment, at 311, the identifier is dynamically received and received in real-time from a requestor, such as an on-line merchant. Moreover, the identifier is received in connection with an on-line and real-time purchasing transaction occurring between the on-line merchant and an on-line buyer. At 311, the identifier is also accompanied by at least a portion of a postal address that is associated with the buyer.

If an account is not found or if an account is identified as unavailable for any reason, then the processing may elect to transmit a rejection notification to the merchant (not shown in FIG. 3). The rejection may be assumed if the processing does not respond to a merchant within a predefined period of time. Alternatively, the rejection may include information that is descriptive and capable of automatically driving some actions of the merchant.

Assuming an account is found and is available, then, at 320, the processing retrieves one or more postal addresses associated with the received identifier. Next, at 330, the received portion of the postal address is compared against portions of the one or more postal addresses associated with the found account. In an embodiment, the received portion of the postal address includes a configurable amount of text associated with a street address name and a postal zip code. In an embodiment, the configurable amount of text associated with the street address name is the first three characters of the street address name.

At 340, the processing makes a decision based on the comparison of 330. Accordingly, if a match is not made, at 341, then the processing transmits a rejection back to the merchant, at 342. However, if a match is made, at 343, then the processing transmits a confirmation back to the merchant, at 350. The merchant may use the confirmation for a variety of its own purposes, such as deciding whether to redirect the buyer back to the processing for purposes of consummating a purchasing transaction, calculating a risk assessment score, independently completing the purchasing transaction, and the like.

In an embodiment, at 344, if a match is made the processing may also elect to generate a token. The token may represent, at 345, an encrypted version of the received buyer identifier and the received portion of the buyer's supplied postal address. In some embodiments, at 346, conditions, events, and/or periods of time may be defined for purposes of determining the lifespan of the token. That is, the token may have a limited and predefined life-cycle during which if the token is detected when a buyer contacts the processing, then the token is used to authorize the buyer for a given transaction, where the transaction is restricted to the postal address represented in the received portion of the buyer supplied postal address. In some cases, the token may be more intelligent and authorize the buyer for multiple subsequent transactions. The token permits added security and provides expedited processing throughput for merchants that elect to automatically redirect buyers that have been validated back to the processing for purposes of consummating pending purchasing transactions.

Figure 4:
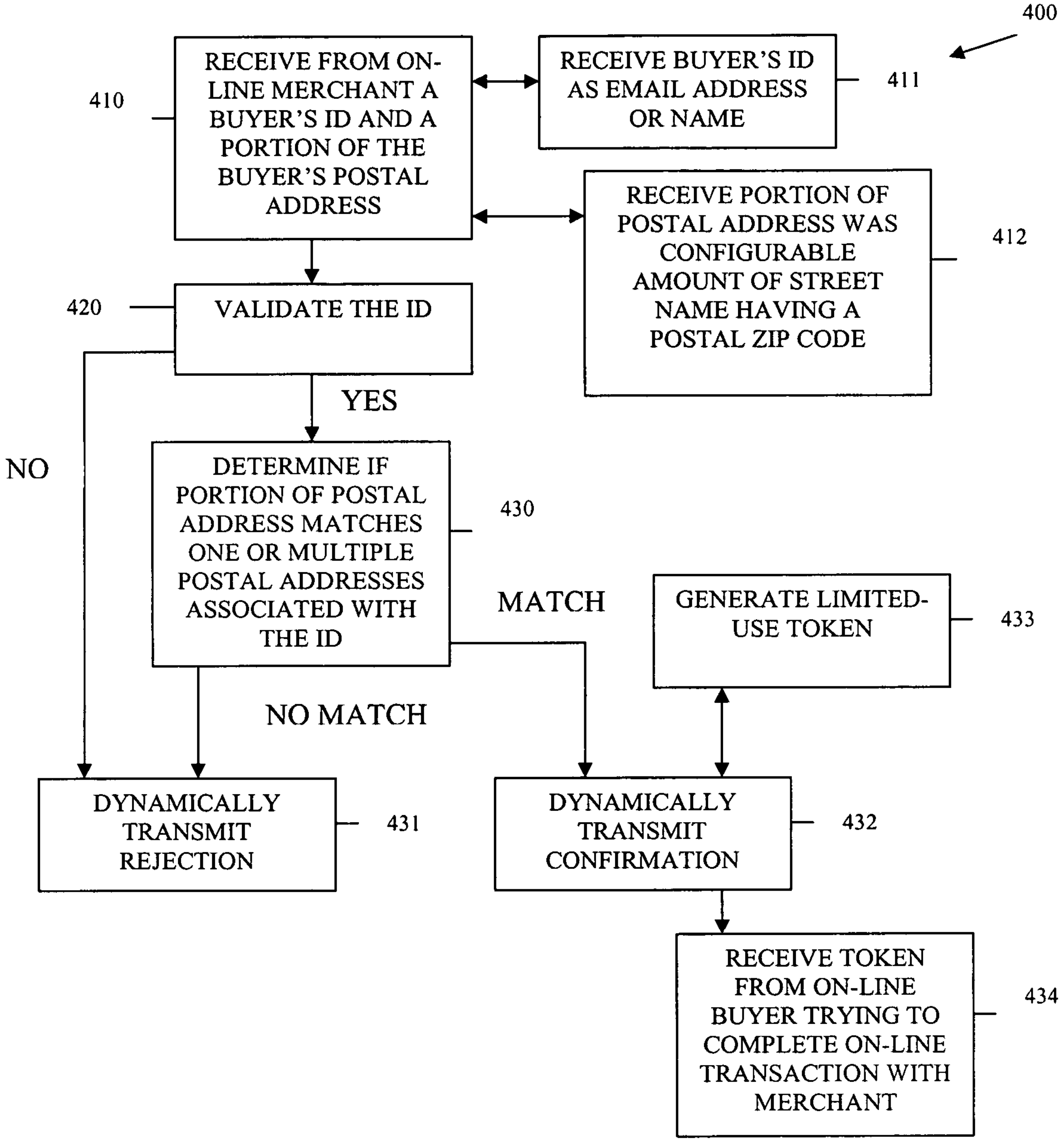
FIG. 4 is a diagram of still another method for automatic address validation, according to an example embodiment.

FIG. 4 is a diagram of still another method 400 for automatic address validation, according to an example embodiment. The method 400 is implemented as instructions within a machine-accessible and readable medium. The instructions when processed perform the processing depicted in FIG. 4. In an embodiment, the instructions reside on removable media, fixed storage, memory, and/or combinations of the same. Furthermore, the instructions are operable to communicate with a variety of automated services over a network. The network may be hardwired, wireless, or a combination of hardwired and wireless.

As an example, the instructions may reside on a removable medium and uploaded into a processing device. Once loaded the instructions perform the method 400 depicted in FIG. 4. As still another example, the instructions may reside on a remote or external processing device and are downloaded over a network to a different processing device where they are initiated and processed to perform the method 400. In yet another example, the instructions are installed as a service on a remote processing site and interact with variety of other automated services over a network, such as the Internet.

In one embodiment, the instructions are implemented within an on-line banking or payment service, such as PayPal. The instructions are designed to provide automatic postal address validation on behalf of on-line merchants. Other portions of the on-line banking/payment service are also designed to interact with on-line buyers for purposes of consummating on-line purchasing transactions occurring between the on-line merchants and the on-line buyers.

At 410, the instructions receive from an on-line merchant an on-line buyer's identification and at least a portion of the buyer's supplied postal address. The postal address is supplied by the buyer to the merchant during a purchasing transaction or acquired from the merchant from its own records in response to a particular buyer. In an embodiment, at 411, the buyer's identification is received as an email address or as a name associated with the buyer. Moreover, the portion of the postal address may be received, at 412, as a configurable amount of the buyer's postal address that includes a predefined amount of text associated with the buyer's street address name and a postal zip code.

At 420, the instructions validate the received identification by determining if the identification is associated with an account recognized by the instructions. If the identification cannot be validated, then, at 431, a rejection is dynamically transmitted to the merchant.

If the identification is validated, then, at 430, the instructions determine whether the portion of the postal address can be matched against other portions associated with potentially multiple candidate postal addresses that are assigned to the identification. Again, if this results in no match, then, at 431, a rejection is dynamically transmitted to the merchant. If a match does occur, then, at 432, a confirmation is dynamically transmitted to the merchant.

When a confirmation is transmitted to the merchant, and in some embodiments, at 433, the instructions may generate a limited-use token to accompany the confirmation. The limited-use token may include an encrypted version of the received buyer identifier and the received portion of the postal address. Furthermore, the limited-use token may be used by other aspects of the instructions for purposes of validating a subsequent buyer that is redirected to the instructions for purposes of consummating an on-line purchasing transaction.

For example, suppose that a limited-use token is generated, at 433, by the instructions and appended to a dynamically transmitted confirmation, at 432. In this scenario, the merchant may redirect its buyer to the instructions for purposes of consummating a pending purchasing transaction. The redirection includes the limited-use token, which is received, at 434, by the instructions. The instructions strip the token and decode or decrypt it; this provides the instructions with the identity of the buyer and with the postal address which are to be used when completing the purchasing transaction. The instructions then provide the buyer with the funding techniques available to the buyer based on the buyer's account and restrict the buyer from altering the postal address associated with the original confirmation and encrypted in the limited-use token.

The limited-use token may be revoked or may otherwise expire based on pre-defined elapsed periods of time, predefined calendar dates, predefined conditions, and/or predefined events. This adds an extra level of security to the use of the token. Thus, as an example, the limited-use token may be set to expire 24 hours after it is issued. The time of token generation/creation may also be encrypted within the token as well, thus the instructions do not have store the tokens; rather, the instructions simply decrypt or decode the tokens and decide whether they are still valid and also decide which buyers and which postal address are applicable to the tokens.

Figure 5:
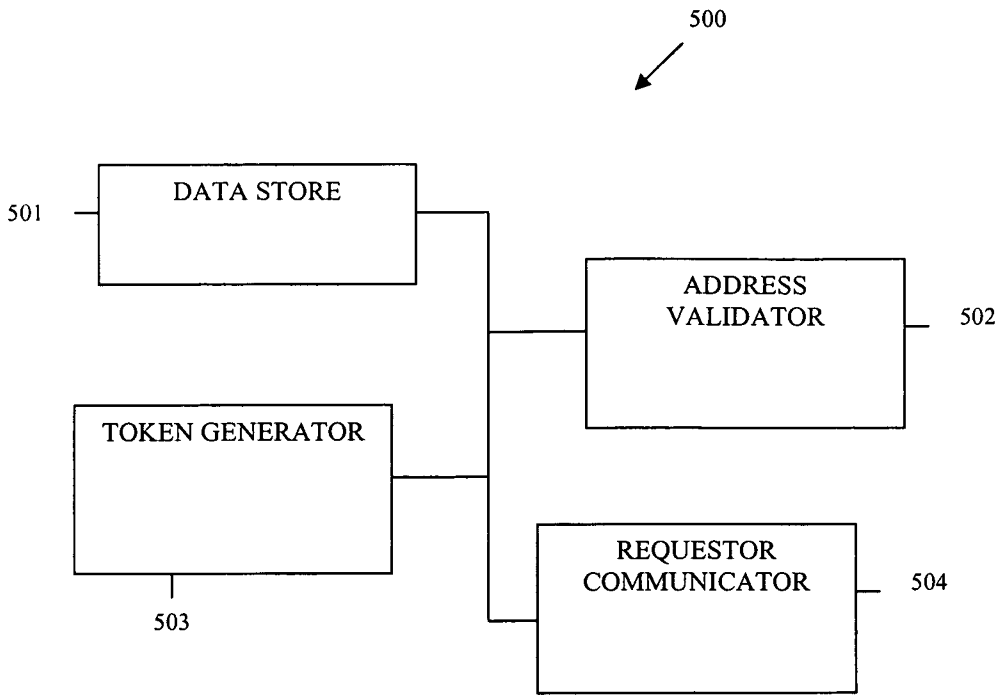
FIG. 5 is a diagram of another automatic address validation system, according to an example embodiment.

FIG. 5 is a diagram of another automatic address validation system 500, according to an example embodiment. The address validation system 500 is implemented in a machine-accessible and readable medium and is accessible over a network. The address validation system 500 implements, among other things, the processing of the methods 300 and 400 of FIGS. 3 and 4. Additionally, the address validation system 500 is an alternative system to the system 100 presented above with respect to FIG. 1.

The address validation system 500 includes a data store 501 and an address validator 502. In some arrangements, the address validation system 500 also includes a token generator 503 and/or a requestor communicator 504.

The data store 501 is adapted to have records where each record is distinguished by identifiers and each identifier may be associated with a plurality of postal addresses. The data store 501 may be a single database, a collection of disparate databases logically organized as a data warehouse, directories, and/or electronic files. The identifiers are associated with user accounts and the postal addresses are associated with user billing and/or shipping addresses. The user accounts may be associated with on-line merchants and with on-line buyers.

The address validator 502 is adapted to be a service that dynamically validates or invalidates pairs of information supplied to it from merchants. Each pair of information includes a buyer's identifier and a portion of a buyer's postal address.

In an embodiment, the address validator 502 is a means for validating portions of a received postal address and a received identifier. The means for validating determines whether to validate or invalidate by searching the data store 501 for records that match the received identifier. A matched record includes a one or more postal addresses associated with the identifier. The portion of a received postal address is compared against other portions of the one or more postal addresses and if a match occurs, then the means for validating determines to validate the received portion of the postal address for the received identifier; otherwise invalidation occurs.

In an embodiment, the address validation system 500 also includes a token generator 503. The token generator 503 may be implemented as software instructions as a means for generating a token. The means for generating a token is adapted to dynamically generate a token for validated postal addresses and identifiers. In an embodiment, the token includes encrypted versions of the received identifier and the received portion of the postal address. Furthermore, the token may be associated with a variety of configurable time periods, events, and/or conditions that determine when and if a token is deemed valid. That is, the token may have a limited-use and a limited life cycle.

In embodiments that use a token, the token may be associated with purchasing transactions of redirected buyers that were originally communicating with a merchant. The buyer may be unaware of the presence of the token, and the address validation system 500 decrypts or decodes the token in order to authenticate the identity of the buyer and acquire the postal address associated with the originally received portion of that postal address. The buyer is then presented with funding techniques associated with the buyers account; the funding techniques may also be assigned within records of the data store 501 and indexed by the buyer's identifier.

In an embodiment, the address validation system 500 may also include a request communicator 504. The request communicator 504 may be implemented as a means for dynamically communicating over a network with a requestor. The requestor may be an on-line merchant and/or an on-line buyer. When the requestor is an on-line merchant, the requestor interacts with the means for dynamically communicating over the network for purposes of supplying the address validator 502 with pairs of buyer identifiers and portions of postal addresses.

The means for dynamically communicating is also adapted to receive confirmations, tokens, and rejections from the token address validator 502 and the token generator 503 and to transmit or to send the confirmations, tokens, and rejections to requestors over the network. The means for dynamically communicating may also be adapted to act as an intermediary between buyers that are redirected by merchants to the address validation system 500 for purposes of consummating an on-line purchasing transaction.

In an embodiment, the address validation system 500 is implemented as an on-line banking/payment service over the Internet and is accessible via WWW browsers and Internet or WWW APIs. For example, the on-line banking/payment service may be PayPal® that interacts with on-line merchant services, such as eBay® for purposes of validating on-line buyers of the eBay® service and their postal addresses. Interactions between PayPal®, eBay®, and the buyers occur in a real-time, dynamic, and automated fashion. The buyer attempts to pay for a good on eBay®, and eBay® in response thereto dynamically supplies a buyer identifier (e.g., buyer email) and a configurable portion of a buyer's postal address (e.g., a zip code and the first three characters of the buyer's street name) to PayPal®. PayPal® then validates the identifier and portion of the postal address and communicates a confirmation to eBay® along with a limited-use token. eBay® then elects to use the confirmation in its own risk assessment calculation, to complete a purchasing transaction with the buyer, or to automatically redirect the buyer to PayPal® along with the limited use token to complete the purchasing transaction. If the buyer is redirected to PayPal®, then PayPal® strips the token decodes it and validates that it is still active. Next, assuming the token is active; PayPal® uses the decoded token to authenticate the buyer and to acquire the postal address for the buyer for the purchasing transaction. Finally, PayPal® accesses the authenticated buyer's account and presents one or more funding options associated with the buyer from which the buyer selects one and completes the purchasing transaction.

The above presented example is but one usage scenario that may be implemented with the teachings presented herein. It is presented for purposes of illustration only and is not intended to limit any aspect of the embodiments presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. An address validation method, the method comprising:

receiving, by one or more hardware processors from a merchant server associated with a merchant, a validation request for validating a combination of an account identifier and a subset of a postal address provided by an online buyer via a user device for a purchase with the merchant, the subset of the postal address including a postal zip code and an incomplete postal street name;

accessing, by the one or more hardware processors, a plurality of financial service accounts to search for a financial service account that is associated with the account identifier;

comparing, by the one or more hardware processors, the postal zip code and the incomplete postal street name against corresponding portions of one or more candidate addresses associated with the financial service account;

determining, by the one or more hardware processors, that the financial service account corresponds to the account identifier and that the subset of the postal address matches corresponding portions of at least one candidate address associated with the financial services account;

generating, by the one or more hardware processors, a response which indicates an authentication of the subset of the postal address in response to the determining;

transmitting, by the one or more hardware processors, the response to the merchant server;

in response to the authentication of the subset of the postal address, generating, by the one or more hardware processors, a token for the purchase using the combination of the account identifier and the subset of the postal address, the generated token indicating an authorization of using a combination of the subset of the postal address and the financial service account for the purchase;

transmitting, by the one or more hardware processors, the token to the merchant server;

receiving, by the one or more hardware processors from the user device of the online buyer, a payment transaction request including the token;

determining, by the one or more hardware processors, that the user device initiated the payment transaction request for the purchase with the merchant prior to the payment transaction request being redirected from the merchant server;

in response to receiving the payment transaction request from the user device and determining that the user device initiated the payment transaction request, providing, on the user device by the one or more hardware processors, a user interface for completing the purchase based on the payment transaction request, the user interface enabling the online buyer to select, from a plurality of funding sources associated with the financial service account, a funding source for the purchase and limiting the online buyer to use the at least one candidate address corresponding to the subset of the postal address from the token as a shipping address for the purchase; and processing a purchase transaction between the merchant and the financial service account based on the selected funding source and the at least one candidate address.

2. The method of claim 1, further comprising:

revoking the token based on a preset period of elapsed time from receiving the validation request.

3. The method of claim 1, wherein the token is generated as an encrypted string having the account identifier and the subset of the postal address.

4. The method of claim 1, wherein the subset of the postal address is received from the merchant server over the Internet.

5. The method of claim 1, further comprising:

in response to processing the purchase transaction, automatically transmitting a confirmation to the merchant server indicating that the purchase transaction is completed.

6. The method of claim 1, wherein the account identifier comprises at least one of a name or an electronic mail address associated with an online service account with the merchant.

7. The method of claim 1, further comprising:

defining at least one of a condition or an event for which the token remains valid for authenticating the online buyer in a subsequent transaction.

8. An address validation system, the address validation system comprising:

a non-transitory memory; and one or more hardware processors coupled to the non-transitory memory and configured to read instructions from the non-transitory memory to cause the system to perform operations comprising:

receiving, from a merchant server associated with a merchant, a validation request to validate a combination of an account identifier and a subset of a postal address provided by an online buyer via a user device for a purchase with the merchant, the subset of the postal address including a postal zip code and an incomplete postal street name;

determining, from a plurality of financial service accounts, a financial service account associated with the account identifier;

comparing the postal zip code and the incomplete postal street name to corresponding portions of one or more postal addresses associated with the financial service account;

determining that the subset of the postal address matches corresponding portions of at least one of the one or more postal addresses associated with the financial service account;

generating a response indicating an authentication of the subset of the postal address in response to the determining;

transmitting the response to the merchant server;

in response to the authentication of the subset of the postal address, generating a token for the purchase, the token generated using the combination of the account identifier and the subset of the postal address for indicating an authorization of using a combination of the subset of the postal address and the financial service account for the purchase;

transmitting the token to the merchant server;

receiving, from the user device of the online buyer, a payment transaction request comprising the token;

determining that the user device initiated the payment transaction request for the purchase with the merchant prior to the payment transaction request being redirected from the merchant server;

in response to receiving the payment transaction request from the user device and determining that the user device initiated the payment transaction request, providing, on the user device, a user interface for completing the purchase based on the payment transaction request, the user interface enabling the online buyer to select, from a plurality of funding sources associated with the financial service account, a funding source for the purchase and limiting the online buyer to use the at least one of the one or more postal addresses corresponding to the subset of the postal address from the token as a shipping address for the purchase; and processing a purchase transaction between the merchant and the financial service account based on the selected funding source and the at least one of the one or more postal addresses.

9. The address validation system of claim 8, wherein the token is generated by encrypting the account identifier and the subset of the postal address.

10. The address validation system of claim 8, wherein the operations further comprise defining at least one of a condition or an event for which the token may be used for authenticating the online buyer in subsequent transactions.

11. The address validation system in of claim 8, wherein the account identifier is associated with an online service account with the merchant.

12. A non-transitory machine-readable medium having stored thereon machine-readable instructions executable to cause a machine to perform operations comprising:

receiving, from a merchant server associated with a merchant, a validation request for validating a combination of an account identifier and a subset of a postal address provided by an online buyer via a user device for a purchase with the merchant, the subset of the postal address including a postal zip code and an incomplete postal street name;

accessing a plurality of financial service accounts to search for a financial service account associated with the account identifier;

comparing the postal zip code and the incomplete postal street name to corresponding portions of one or more postal addresses associated with the financial service account associated with the account identifier;

determining that the financial service account corresponds to the account identifier and that the subset of the postal address matches corresponding portions of at least one postal address associated with the financial service account;

generating a response that indicates an authentication of the subset of the postal address in response to the determining;

transmitting the response to the merchant server;

in response to the authentication of the subset of the postal address, generating a token for the purchase based on the combination of the account identifier and the subset of the postal address, the generated token indicating an authorization of using a combination of the subset of the postal address and the financial service account for the purchase;

transmitting the token to the merchant server;

receiving, from the user device of the online buyer, a payment transaction request including the token;

determining that the user device initiated the payment transaction request for the purchase with the merchant prior to the payment transaction request being redirected from the merchant server;

in response to receiving the payment transaction request from the user device and determining that the user device initiated the payment transaction request, providing, on the user device, a user interface for completing the purchase based on the payment transaction request, the user interface enabling the online buyer to select, from a plurality of funding sources associated with the financial service account, a funding source for the purchase and limiting the online buyer to use the at least one postal address corresponding to the subset of the postal address from the token as a shipping address for the purchase; and processing a payment transaction between the merchant and the financial service account based on the selected funding source and the at least one postal address.

13. The machine-readable medium of claim 12, wherein the account identifier comprises at least one of an electronic mail address or a name associated with the online buyer.

14. The method of claim 1, wherein the validation request is redirected by the merchant server from the user device, wherein the validation request is addressed to the merchant server.

15. The method of claim 7, wherein the condition is time-dependent.

16. The method of claim 1, wherein the token further comprises an expiration time, and wherein the method further comprises determining whether the payment transaction request is received from the user device before the expiration time.

17. The method of claim 16, further comprising denying the payment transaction request in response to a determination that the payment transaction request is received from the user device after the expiration time.

18. The address validation system of claim 8, wherein the token further comprises an expiration time, and wherein the operations further comprise determining whether the payment transaction request is received from the user device before the expiration time.

19. The address validation system of claim 18, wherein the operations further comprise denying the payment transaction request in response to a determination that the payment transaction request is received from the user device after the expiration time.

20. The machine-readable medium of claim 12, wherein the token further comprises an expiration time, and wherein the operations further comprise:

determining whether the payment transaction request is received from the user device before the expiration time; and denying the payment transaction request in response to a determination that the payment transaction request is received from the user device after the expiration time.

* * * * *